Figure 1:
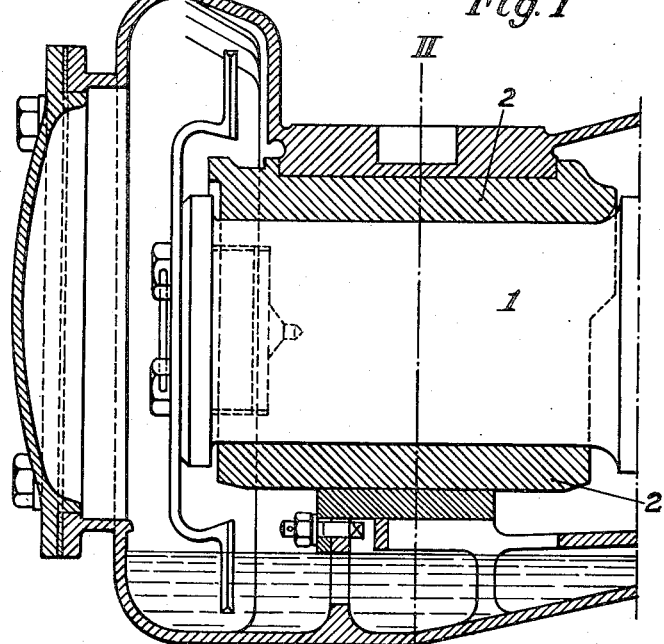

May 19, 1936.  V. A. BARY  2,041,390

LUBRICATED BEARING FOR RAILROAD VEHICLE AXLES

Filed June 12, 1931

Inventor
Victor Alex. Bary

Patented May 19, 1936

2,041,390

UNITED STATES PATENT OFFICE 2,041,390

LUBRICATED BEARING FOR RAILROAD VEHICLE AXLES

Victor Alexander Bary, London, England

Application June 12, 1931, Serial No. 543,882
In Germany June 23, 1930

6 Claims. (Cl. 308—83)

The present invention relates to axle bearings and more particularly to an improved arrangement for lubricating the journals of rail vehicles.

According to the invention, the lubricant is accumulated and concentrated at the side of the journal at which it enters to form a cushion or roll of lubricant from which it is then introduced into a wedge-like or tapered space which is provided for its entry between the journal and axle-brass. This method has the great advantage of ensuring that, after the cushion or roll of lubricant has been formed, a constant and automatic supply of lubricant from this roll to the said tapered space still takes place and the film of lubricant formed between the journal and the axle-brass is consequently maintained, even if the primary supply of lubricant to the journal be interrupted. Thus the lubricant which is taken from the roll of lubricant and carried round by the journal is always concentrated again in the roll which is thereby maintained, so that the lubricant circulates around the journal without its function of lubrication being interrupted. Since the primary supply of lubricant is dependent on the functioning of certain devices, for example of a rotary conveyor blade, and such devices are liable to fail if broken or deformed, the result is obtained by means of the present invention that, after the formation of the roll of lubricant, the lubrication of the journal is secured even if the primary lubricant supply fails. Therefore a quickly moving train of vehicles will in any case arrive at the next stopping place, without heating up of a bearing occurring, even if an oil conveyor blade be broken during the journey, since, at the beginning of the journey, the lubricant would have already been concentrated at the entry side of the journal in the bearing in question and would be introduced into the tapered space between the journal and axle-brass from the roll of lubricant thus formed until the destination was reached, without any further primary supply of lubricant to the journal being required. Thus by means of the new method of lubrication the certainty of operation of rail vehicles is increased to a degree not hitherto attainable. In carrying out the method according to the invention, the primary supply of lubricant to the journal can be effected by most diverse ways and means. It has been found particularly advantageous to effect the primary supply of lubricant to the journal by dripping.

Apparatus for carrying the new method into effect is characterized by the arrangement laterally of the journal of spaces which do not interfere with the formation of the cushion or roll of lubricant. Preferably, the spaces for the formation of the roll of lubricant which are provided laterally of the journal extend over the entire length of the axle-brass, in order that the formation of the roll of lubricant may also proceed over the entire length of the axle-brass, so that a perfect liquid friction between the axle-brass and journal results. If the spaces for the formation of the roll of lubricant are arranged on both sides of the journal, it becomes possible to use the vehicle for travelling in both directions. These lateral spaces, whether provided in a circular brass or in the axle box wall or other adjacent structure, are of sufficient radial depth to prevent contact between the walls of such spaces and the roll of lubricant to the end that the forces of adhesion acting on the roll are reduced. The suction effect created by the rotation of the journal is thus enabled to oversome the combined forces of gravity and adhesion acting to cause the lubricant to flow down into the supply sump, and the roll of lubricant is thereby maintained on the journal.

Figure 2:
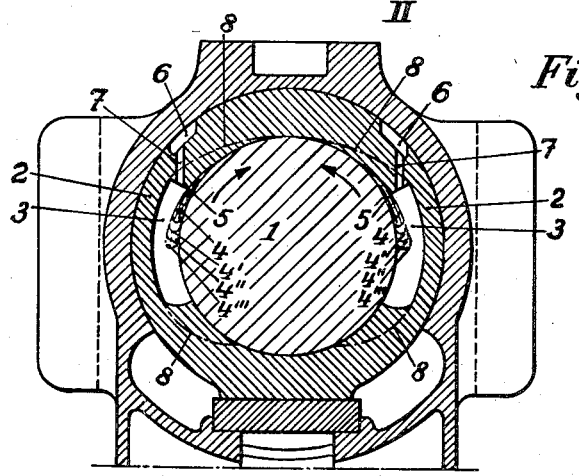

A constructional embodiment of an apparatus for carrying out the new method is illustrated by way of example in the accompanying drawing, in which Fig. 1 is a longitudinal section through an axle-box, and Fig. 2 is a cross-section on the line II—II of Fig. 1.

Referring to the drawing, 1 is the journal and 2 the annular, closed axle-brass in which the journal is carried. In accordance with the invention, there are arranged in the brass 2, laterally of the journal 1, recesses 3 in such a manner that they do not interfere with the formation of a roll of lubricant which is produced by the concentration of the lubricant at the entry side of the journal. The size of the roll of lubricant varies in accordance with the different speeds of the vehicle, and its form at low speeds corresponds approximately to that indicated by 4 in the drawing, while at higher speeds its form corresponds to that indicated in the drawing by 4', 4" and 4'''. If now, for example, the primary supply of lubricant to the journal, which is hereinafter explained, be interrupted, no interruption in the lubrication of the axle-journal occurs in spite of this. Thus the lubricant which is taken from the roll of lubricant 4, 4', 4", 4''' and introduced into the tapered space between the axle-brass 2 and journal 1 is always collected or concentrated again in the roll of lubricant, so that there is a continuous circulation of the lubricant round the journal which ensures on the one hand the desired liquid friction between the journal and the axle-brass, and on the other hand the constant automatic lubrication of the journal without further primary supply of lubricant. Thus, for example, if the oil blade illustrated in Fig. 1 be broken, the lubrication of the axle-journal is nevertheless maintained, because the roll of lubricant 4, 4', 4'', 4''' is produced immediately after starting. As soon as the vehicle arrives at the next stopping place the formation of the roll of lubricant of course comes to an end. The vehicle is then, however, at rest so that the primary supply of lubricant can be again restored by fitting a new oil blade.

In the constructional example illustrated the primary supply of lubricant is effected from the longitudinal grooves 6 arranged on the top of the axle-brass 2 by way of transverse passages 7 to a drip edge 5, which extends over the length of the axle-brass and as shown is spaced from the journal and lies within the vertical projection of the journal. From this drip edge the oil primarily drips continuously on to the surface of the journal along its entire length, so that immediately after the vehicle starts the roll of lubricant 4, 4', 4'', 4''' is formed. Since the primary supply of lubricant is normally also maintained during the journey, the lubricant supplied to the journal in this manner acts above all as a cooling medium. The viscosity of the lubricant is therefore maintained owing to the reduction in the temperature of the bearing, so that very favourable coefficients of friction between the axle-brass and the journal are obtained.

The means for carrying into effect the method according to the invention are not limited to the constructional example illustrated. Thus, for example, the recesses 3, which preferably extend over the entire length of the axle-brass, so that the formation of a roll of lubricant over the entire length of the axle-brass is ensured, instead of being of the shape illustrated in full lines may also have a shape corresponding to the dotted line 8, without departing from the invention.

The lateral spaces 3 are situated on both sides of the journal, in order to ensure that the lubrication from the roll of lubricant will occur in both directions of travel.

I claim:

1. An axle bearing for rail vehicles comprising, in combination, an axle journal, an axle box, a substantially cylindrical bearing brass in said box, means for delivering lubricant to the top of said brass for distribution upon the journal, said brass at the upper load-bearing section thereof being of greater inner radius than the radius of the journal at both sides of the crown of the brass throughout the length of the latter to provide open-ended wedge-shaped entry spaces at both sides of the area of contact between the journal and brass, said brass being provided with passageways for supplying the lubricant fed to the top thereof to said wedge-shaped entry spaces, and being cut away laterally of the journal below the wedge-shaped entry spaces to a point below the horizontal plane passing through the center of the journal and to such a radial depth that the cutout is capable of receiving the largest roll of lubricant that may form upon the surface of the journal during the rotation of the latter without contact between such roll and the stationary walls of the cutout, the adhesion forces acting upon the roll being thereby reduced to a minimum and the suction effect produced by the rotation of the journal being thereby enabled to overcome the combined forces of limited adhesion and gravity tending to cause the oil to trickle to the bottom of the housing, and such suction effect thereby operating to maintain said roll of lubricant upon the journal and continuing the feed of lubricant even after the lubricant delivering means have become inoperative during the motion of the vehicle, said passageways being in communication with the cutouts below the wedge-shaped entry spaces.

2. An axle bearing as set forth in claim 1, wherein the cutouts below said wedge-shaped entry spaces extend throughout the length of the bearing brass.

3. An axle bearing for rail vehicles comprising, in combination, an axle journal, an axle box, a lubricant sump in said box, a substantially cylindrical bearing brass in said housing, said brass upon its loaded portion being of greater internal radius throughout its whole length than the radius of the journal, whereby open wedge-shaped entry spaces are formed at both sides of the area of contact between the journal and brass, means for conveying lubricant from the lubricant sump to the upper side of the bearing brass, said brass being provided with bores for receiving the lubricant supplied to the upper surface of the brass, said brass being cut away below the wedge-shaped entry spaces and laterally of the journal from a point above down to a point below the horizontal plane through the center of the axle journal, thus forming a cut edge at each side of the journal which is parallel to the journal and lies between the wall surfaces of the brass bounding the wedge-shaped entry space and the lateral cutout, said edge lying within the vertical projection of the journal, said bores being arranged to conduct the lubricant received by them to such edges, said edges adapted to distribute the lubricant along the length of the journal and to drip the lubricant upon such journal, the radial depth of said cutouts being so determined that the cutouts are capable of taking up the greatest roll of lubricant which forms upon the surface of the axle journal during the rotation of the latter without contact between such roll and the stationary walls of the cutout, so that the adhesion forces acting upon the roll are reduced to a minimum while the suction effect created by the rotation of the journal is enabled to overcome the combined forces of gravity and adhesion acting to cause the oil to flow down into the supply sump, said suction effect operating to maintain the formation of said lubricant roll upon the journal surface.

4. An axle bearing for rail vehicles comprising, in combination, an axle journal, an axle box, a lubricant sump in said axle box, a bearing brass positioned in said box, said bearing brass upon its loaded portion and along its whole length being of greater internal radius than the radius of the journal, whereby open wedge-shaped entry spaces are formed at both sides of the area of contact between the axle journal and the bearing brass, means for conveying lubricant from the lubricant sump to the bearing brass, means for supplying the lifted lubricant to the wedge-shaped entry spaces, said bearing brass being cut away below the wedge-shaped entry spaces laterally of the journal from a point above down to a point below the horizontal plane through the center of the journal, thus forming a cut edge at each side of the journal which is parallel to the journal and lies between the wedge-shaped entry space and the wall surface forming the cutout, said edge lying within the vertical projection of the journal, the radial depth of said cutout being so determined that each cutout is capable of accommodating the largest roll of lubricant which will form upon the surface of the journal during the rotation of the latter without contact between the roll and the stationary walls of the cutout, so that the forces of adhesion acting upon the roll are reduced to a minimum, and the suction effect created by the rotation of the journal is enabled to overcome the combined forces of gravity and adhesion acting to cause the oil to flow down to the lubricant sump, said suction effect thus maintaining the formation of said lubricant roll upon the journal.

5. An axle bearing for rail vehicles comprising, in combination, an axle journal, an axle box, a lubricant sump in said axle box, a bearing brass positioned in said box, said bearing brass at its loaded part being of greater internal radius along its whole length than the radius of the journal, whereby open wedge-shaped entry spaces are formed at both sides of the area of contact between the journal and brass, means for conveying lubricant from the lubricant sump to the bearing brass, means for supplying the lifted lubricant to the wedge-shaped entry spaces of the brass, said structure being provided with free spaces laterally of the journal below the wedge-shaped entry spaces and extending downwardly to a point below the horizontal plane through the center of the journal, the bounding surfaces of said free spaces being so formed that the wall edge between each such space and the adjoining entry space which runs parallel to the journal, together with the bearing brass surface bounding the wedge-shaped entry space, lie inside of the vertical projection of the axle journal, the radial depth of said free spaces being so determined that such free spaces are capable of accommodating the largest lubricant roll which will form upon the surface of the journal during the rotation of the latter without contact between the roll and the bounding surfaces of such free spaces, whereby the forces of adhesion acting upon the roll are reduced to a minimum, and the suction effect created by the rotation of the journal is enabled to overcome the combined forces of gravity and adhesion acting to cause the lubricant to flow down into the sump, said suction effect thus maintaining the formation of said lubricant roll upon the axle journal.

6. An axle bearing for rail vehicles comprising, in combination, an axle journal, an axle box, a lubricant sump in said box, a bearing brass positioned in said box, said bearing brass at its loaded portion being of greater internal radius along its whole length than the radius of the axle journal, whereby open wedge-shaped entry spaces are formed at both sides of the area of contact between the journal and brass, means for conveying lubricant from the lubricant sump to the bearing brass, means for supplying the lifted lubricant to the wedge-shaped entry spaces, said structure being provided with free spaces laterally of the journal and below the wedge-shaped entry spaces and extending from a point above to a point below the horizontal plane through the center of the axle journal, the radial depth of said free spaces being so determined that such free spaces are capable of accommodating the largest lubricant roll which will form upon the surface of the journal during the rotation of the latter without contact between the roll and the bounding walls of such free spaces, so that the forces of adhesion acting upon the roll are reduced to a minimum and the suction effect created by the rotation of the journal is enabled to overcome the combined forces of gravity and adhesion acting to cause the oil to flow down into the sump, the said suction effect thus maintaining the formation of said lubricant roll upon the journal, the adhesion surfaces of said axle bearing which hold the roll and are located at both sides of the journal being at a distance from each other which is smaller than the diameter of the journal.

VICTOR ALEX. BARY.